US010327114B2

(12) United States Patent
Yang et al.

(10) Patent No.: US 10,327,114 B2
(45) Date of Patent: Jun. 18, 2019

(54) MESSAGE SENDING METHOD, MOBILE BROADBAND DEVICE, AND HOST

(71) Applicant: Huawei Technologies Co., Ltd., Shenzhen (CN)

(72) Inventors: Dedong Yang, Shenzhen (CN); Zhen Zhong, Shenzhen (CN); Wei Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 15/321,311

(22) PCT Filed: Jun. 12, 2015

(86) PCT No.: PCT/CN2015/081360
§ 371 (c)(1),
(2) Date: Dec. 22, 2016

(87) PCT Pub. No.: WO2015/196936
PCT Pub. Date: Dec. 30, 2015

(65) Prior Publication Data
US 2017/0164168 A1 Jun. 8, 2017

(30) Foreign Application Priority Data
Jun. 26, 2014 (CN) .......................... 2014 1 0294737

(51) Int. Cl.
*H04W 4/12* (2009.01)
*H04W 8/20* (2009.01)
(Continued)

(52) U.S. Cl.
CPC .............. *H04W 4/12* (2013.01); *H04L 51/38* (2013.01); *H04L 67/26* (2013.01); *H04W 8/20* (2013.01);
(Continued)

(58) Field of Classification Search
CPC ......... H04W 4/12; H04W 8/20; H04W 76/10; H04L 51/38; H04L 67/26
(Continued)

(56) References Cited

U.S. PATENT DOCUMENTS

2012/0173901 A1   7/2012  Soliman et al.
2012/0174208 A1*  7/2012  Sperling ............. H04L 63/0823
                                                                      726/10

(Continued)

FOREIGN PATENT DOCUMENTS

CN        1652529 A      8/2005
CN      101141485 A      3/2008
(Continued)

OTHER PUBLICATIONS

Machine Translation and Abstract of Chinese Publication No. CN1652529, Aug. 10, 2005, 19 pages.
(Continued)

*Primary Examiner* — Glenford J Madamba
(74) *Attorney, Agent, or Firm* — Conley Rose, P.C.

(57) ABSTRACT

A message sending method, a mobile broadband (MBB) device, and a host, where the method includes receiving, by an MBB device, authentication information sent by a host, requesting, by the MBB device, authentication from a notification server according to the authentication information, to establish a transmission path between the MBB device and the notification server, determining, by the MBB device, a message required to be transmitted to the host, and sending, by the MBB device, the message to the notification server using the transmission path such that the notification server sends the message to the host. The message can be actively pushed to the host when the message required to be
(Continued)

transmitted to a host is determined such that signaling overheads can be significantly reduced, and power consumption can be reduced.

16 Claims, 4 Drawing Sheets

(51) Int. Cl.
*H04W 76/10* (2018.01)
*H04L 12/58* (2006.01)
*H04L 29/08* (2006.01)
*H04W 12/06* (2009.01)

(52) U.S. Cl.
CPC ........... *H04W 12/06* (2013.01); *H04W 76/10* (2018.02); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01)

(58) Field of Classification Search
USPC ........................................................ 709/206
See application file for complete search history.

(56) References Cited

U.S. PATENT DOCUMENTS

| | | |
|---|---|---|
| 2012/0209975 A1 | 8/2012 | Zong |
| 2013/0166658 A1 | 6/2013 | Yin |
| 2013/0254357 A1* | 9/2013 | Zhong ................ H04L 12/2856 709/222 |

FOREIGN PATENT DOCUMENTS

| | | |
|---|---|---|
| CN | 101355444 A | 1/2009 |
| CN | 102130957 A | 7/2011 |
| CN | 102413072 A | 4/2012 |
| CN | 102932968 A * | 2/2013 |
| CN | 102932968 A | 2/2013 |
| CN | 103051715 A | 4/2013 |
| EP | 2434728 A1 | 3/2012 |
| EP | 2487874 A1 | 8/2012 |
| EP | 2648366 A2 | 10/2013 |
| EP | 2704358 A1 * | 3/2014 ......... H04L 41/0253 |
| EP | 2704358 A1 | 3/2014 |
| JP | 2013527683 A | 6/2013 |
| JP | 2014503148 A | 2/2014 |
| WO | 2011130543 A1 | 10/2011 |

OTHER PUBLICATIONS

Machine Translation and Abstract of Chinese Publication No. CN101141485, Mar. 12, 2008, 16 pages.
Machine Translation and Abstract of Chinese Publication No. CN103051715, Apr. 17, 2013, 23 pages.
Foreign Communication From a Counterpart Application, Chinese Application No. 201410294737.9, Chinese Office Action dated Feb. 23, 2018, 8 pages.
Foreign Communication From a Counterpart Application, Japanese Application No. 2016-574974, Japanese Office Action dated Apr. 3, 2018, 3 pages.
Foreign Communication From a Counterpart Application, Japanese Application No. 2016-574974, English Translation of Japanese Office Action dated Apr. 3, 2018, 4 pages.
Machine Translation and Abstract of Chinese Publication No. CN101355444, Jan. 28, 2009, 10 pages.
Machine Translation and Abstract of Chinese Publication No. CN102130957, Jul. 20, 2011, 8 pages.
Foreign Communication From a Counterpart Application, European Application No. 15811516.2, Extended European Search Report dated May 12, 2017, 7 pages.
Foreign Communication From a Counterpart Application, PCT Application No. PCT/CN2015/081360, English Translation of International Search Report dated Sep. 18, 2015, 2 pages.
Foreign Communication From a Counterpart Application, PCT Application No. PCT/CN2015/081360, English Translation of Written Opinion dated Sep. 18, 2015, 5 pages.

* cited by examiner

US 10,327,114 B2

MESSAGE SENDING METHOD, MOBILE BROADBAND DEVICE, AND HOST

CROSS-REFERENCE TO RELATED APPLICATIONS

This application is a U.S. National Stage application of International Patent Application No. PCT/CN2015/081360, filed on Jun. 12, 2015 which claims priority to Chinese Patent Application No. 201410294737.9, filed on Jun. 26, 2014. Both of the aforementioned applications are hereby incorporated by reference in their entireties.

TECHNICAL FIELD

The present disclosure relates to the communications field, and in particular, to a message sending method, a mobile broadband (MBB) device, and a host in the communications field.

BACKGROUND

With the rapid development of mobile devices, an application program has an urgent requirement for acquiring an instant message. An MBB device is a device that can provide a wireless network access service for a mobile device. A polling manner is mainly used currently to instantly acquire a message from the MBB device, that is, the mobile device periodically queries the MBB device, to confirm whether there is an instant message to be sent to an application program of the mobile device. According to permission settings of the MBB device, the MBB device has no capability of actively sending a notification message to a host, and also has no capability of waking up a host in a sleep state.

Therefore, the foregoing polling manner leads to a large quantity of signaling overheads between devices, and causes a mobile device to fail to sleep or fail to receive an instant message during sleep. Therefore, people expect a method for actively sending a message such that signaling overheads between devices can be reduced, and power consumption of a mobile device can be reduced.

SUMMARY

Embodiments of the present disclosure provide a message sending method, an MBB device, and a host, which enables a message to be actively pushed to a host such that signaling overheads can be significantly reduced when the message required to be transmitted to the host is determined.

According to a first aspect, a message sending method is provided, where the method includes receiving, by an MBB device, authentication information sent by a host, requesting, by the MBB device, authentication from a notification server according to the authentication information, to establish a transmission path between the MBB device and the notification server, determining, by the MBB device, a message required to be transmitted to the host, and sending, by the MBB device, the message to the notification server using the transmission path such that the notification server sends the message to the host.

With reference to the first aspect, in a first possible implementation manner of the first aspect, sending, by the MBB device, the message to the notification server using the transmission path includes determining, by the MBB device, a target object requirement of the message by parsing the message, determining, by the MBB device, at least one target host from multiple hosts according to the target object requirement, and sending, by the MBB device using the transmission path, the message to at least one notification server corresponding to the at least one target host such that the at least one notification server sends the message to an application of the at least one target host.

With reference to the first aspect, in a second possible implementation manner of the first aspect, sending, by the MBB device, the message to the notification server using the transmission path includes sending, by the MBB device according to target host information carried in the message, the message to a notification server corresponding to a target host indicated by the target host information such that the notification server sends the message to an application of the target host.

With reference to the first aspect or either of the first and second possible implementation manners of the first aspect, in a third possible implementation manner of the first aspect, requesting, by the MBB device, authentication from a notification server according to the authentication information includes determining an operating system of the host, and requesting, according to the authentication information, authentication from a notification server corresponding to the operating system of the host.

With reference to the third possible implementation manner of the first aspect, in a fourth possible implementation manner of the first aspect, the operating system of the host includes an iOS operating system, a WINDOWS operating system, and an ANDROID operating system.

With reference to the first aspect or any one of the first to fourth possible implementation manners of the first aspect, in a fifth possible implementation manner of the first aspect, receiving, by an MBB device, authentication information sent by a host includes receiving, by the MBB device, the authentication information sent by the host in at least one transmission manner of the following transmission manners a Universal Serial Bus (USB) transmission manner, a WI-FI transmission manner, a Wireless Universal Serial Bus (WUSB) transmission manner, a THUNDERBOLT transmission manner, a bit torrent (BT) transmission manner, a ZIGBEE transmission manner, a dedicated short range communications (DSRC) technology transmission manner, and a mobile communication transmission manner.

With reference to the first aspect or any one of the first to fifth possible implementation manners of the first aspect, in a sixth possible implementation manner of the first aspect, receiving, by an MBB device, authentication information sent by a host includes receiving, by the MBB device, the authentication information sent by the application of the host.

With reference to the sixth possible implementation manner of the first aspect, in a seventh possible implementation manner of the first aspect, the authentication information is determined by the notification server according to authentication request information sent by the application to the notification server.

With reference to the first aspect or any one of the first to seventh possible implementation manners of the first aspect, in an eighth possible implementation manner of the first aspect, the authentication information includes at least one type of the following information a key, identification information of the MBB device, identification information of the host, identification information of the application of the host, version information of the application, and login information of the application.

With reference to the first aspect or any one of the first to eighth possible implementation manners of the first aspect, in a ninth possible implementation manner of the first aspect, the message required to be transmitted to the host is a message received from a service server by the MBB device, or the message required to be transmitted to the host is generated by the MBB device.

According to a second aspect, an MBB device is provided, where the MBB device includes a receiving module configured to receive authentication information sent by a host, an authentication module configured to request authentication from a notification server according to the authentication information received by the receiving module, to establish a transmission path between the MBB device and the notification server, a determining module configured to determine a message required to be transmitted to the host, and a sending module configured to send the message determined by the determining module to the notification server using the transmission path such that the notification server sends the message to the host.

With reference to the second aspect, in a first possible implementation manner of the second aspect, the determining module is further configured to determine a target object requirement of the message by parsing the message, and determine at least one target host from multiple hosts according to the target object requirement, where the sending module is further configured to send, using the transmission path, the message to at least one notification server corresponding to the at least one target host such that the at least one notification server sends the message to an application of the at least one target host.

With reference to the second aspect, in a second possible implementation manner of the second aspect, the sending module is further configured to send, according to target host information carried in the message, the message to a notification server corresponding to a target host indicated by the target host information such that the notification server sends the message to an application of the target host.

With reference to the second aspect or either of the first and second possible implementation manners of the second aspect, in a third possible implementation manner of the second aspect, the determining module is further configured to determine an operating system of the host, where the authentication module is further configured to request, according to the authentication information, authentication from a notification server corresponding to the operating system of the host.

With reference to the third possible implementation manner of the second aspect, in a fourth possible implementation manner of the second aspect, the authentication module includes an iOS authentication unit configured to request authentication from the notification server that has an iOS operating system, a WINDOWS authentication unit configured to request authentication from the notification server that has a WINDOWS operating system, and an ANDROID authentication unit configured to request authentication from the notification server that has an ANDROID operating system.

With reference to the second aspect or any one of the first to fourth possible implementation manners of the second aspect, in a fifth possible implementation manner of the second aspect, the receiving module is further configured to receive, in at least one transmission manner of the following transmission manners, the authentication information sent by the host a USB transmission manner, a WI-FI transmission manner, a WUSB transmission manner, a THUNDERBOLT transmission manner, a BT transmission manner, a ZIGBEE transmission manner, a DSRC technology transmission manner, and a mobile communication transmission manner.

With reference to the second aspect or any one of the first to fifth possible implementation manners of the second aspect, in a sixth possible implementation manner of the second aspect, the receiving module is further configured to receive the authentication information sent by the application of the host.

With reference to the sixth possible implementation manner of the second aspect, in a seventh possible implementation manner of the second aspect, the authentication information received by the receiving module is determined by the notification server according to authentication request information sent by the application to the notification server.

With reference to the second aspect or any one of the first to seventh possible implementation manners of the second aspect, in an eighth possible implementation manner of the second aspect, the authentication information received by the receiving module includes at least one type of the following information a key, identification information of the MBB device, identification information of the host, identification information of the application of the host, version information of the application, and login information of the application.

With reference to the second aspect or any one of the first to eighth possible implementation manners of the second aspect, in a ninth possible implementation manner of the second aspect, the message that is determined by the determining module and that is required to be transmitted to the host is a message received from a service server by the MBB device, or the message that is determined by the determining module and that is required to be transmitted to the host is generated by the MBB device.

With reference to the second aspect or any one of the first to ninth possible implementation manners of the second aspect, in a tenth possible implementation manner of the second aspect, the MBB device is disposed in the host.

According to a third aspect, a host is provided, where the host includes the MBB device according to the embodiments of the present disclosure, and the MBB device includes a receiving module configured to receive authentication information sent by the host, an authentication module configured to request authentication from a notification server according to the authentication information received by the receiving module, to establish a transmission path between the MBB device and the notification server, a determining module configured to determine a message required to be transmitted to the host, and a sending module configured to send the message determined by the determining module to the notification server using the transmission path such that the notification server sends the message to the host.

Based on the foregoing technical solutions, according to the message sending method, the MBB device, and the host in the embodiments of the present disclosure, the MBB device receives authentication information sent by the host, and passes authentication of a notification server according to the authentication information such that when a message required to be transmitted to the host is determined, the MBB device can send the message to the notification server using a transmission path established during an authentication process in order to send the message to the host using the notification server. Therefore, the MBB device can actively push the message to the host such that a large quantity of signaling overheads caused by polling, and heavy power consumption can be avoided, as a result, signaling overheads can be significantly reduced, and power consumption can be reduced.

BRIEF DESCRIPTION OF DRAWINGS

To describe the technical solutions in the embodiments of the present disclosure more clearly, the following briefly introduces the accompanying drawings required for describing the embodiments of the present disclosure, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, or the like.

It should be further understood that a host in the embodiments of the present disclosure may include a portable mobile device or may include various non-portable terminals, where the mobile device is, for example, user equipment (UE), and the UE may also be referred to as a terminal, a mobile station (MS), a mobile terminal, or the like. In the embodiments of the present disclosure, the host may access a radio access network (RAN) using an MBB device in order to communicate with one or more core networks. For example, the host may be a mobile phone (also referred to as a "cellular phone") or a computer with a mobile terminal. For another example, the host may be a portable, pocket-sized, handheld, computer built-in, or in-vehicle mobile apparatus.

Figure 1:
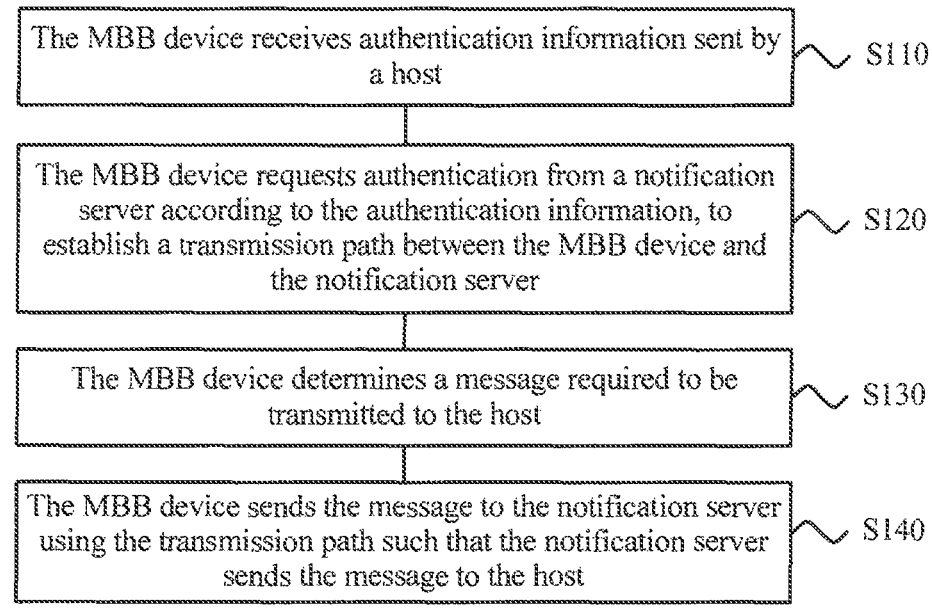
FIG. 1 is a schematic flowchart of a message sending method according to an embodiment of the present disclosure.

FIG. 1 shows a schematic flowchart of a message sending method 100 according to an embodiment of the present disclosure. The method 100 may be executed by an MBB device. As shown in FIG. 1, the method 100 includes the following steps.

Step S110: The MBB device receives authentication information sent by a host.

Step S120: The MBB device requests authentication from a notification server according to the authentication information, to establish a transmission path between the MBB device and the notification server.

Step S130: The MBB device determines a message required to be transmitted to the host.

Step S140: The MBB device sends the message to the notification server using the transmission path such that the notification server sends the message to the host.

Further, in order that the message can be actively pushed to the host when the message is required to be transmitted to the host, the MBB device may request authentication from the notification server according to address information of the notification server and the received authentication information sent by the host such that the transmission path between the MBB device and the notification server can be established when the authentication succeeds. Therefore, the MBB device can send the message to the notification server using the transmission path when the MBB device determines the message required to be transmitted to the host.

Because the notification server is bound to an operating system of the host, the notification server has higher operating permission, and has a capability of actively sending a notification message to the host, and can also wake up a host in a sleep state. Therefore, after receiving the message sent by the MBB device, the notification server may further send the message to the host such that the message can be actively pushed to the host, and even if the host is in a sleep state, the notification server can wake up the host such that the host can acquire the message in real time.

Therefore, according to the message sending method in this embodiment of the present disclosure, an MBB device receives authentication information sent by a host, and passes authentication of a notification server according to the authentication information such that when a message required to be transmitted to the host is determined, the MBB device can send the message to the notification server using a transmission path established during an authentication process in order to send the message to the host using the notification server. Therefore, the MBB device can actively push the message to the host regardless of whether the host is in a sleep state such that a large quantity of signaling overheads of the host that are caused by polling, and heavy power consumption of the host caused because the host cannot sleep can be avoided, as a result, signaling overheads of the host can be significantly reduced, and power consumption of the host can be reduced.

In addition, according to the message sending method in this embodiment of the present disclosure, a scheme of active message notification can be evolved from a scheme in which a message is pushed by a server in the industry to a scheme in which a message is pushed by a terminal, and the MBB device is used as an important component of a push mechanism such that a common message can also be pushed. Therefore, it is not required to redevelop and deploy a new service server for the push mechanism.

In step S110, depending on a connection manner between the MBB device and the host, the MBB device may receive, in multiple manners, the authentication information sent by the host.

Optionally, in this embodiment of the present disclosure, receiving, by the MBB device, authentication information sent by a host includes receiving, by MBB device, the authentication information sent by the host in at least one transmission manner of the following transmission manners, a USB transmission manner, a WI-FI transmission manner, a WUSB transmission manner, a THUNDERBOLT transmission manner, a BT transmission manner, a ZIGBEE transmission manner, a DSRC technology transmission manner, and a mobile communication transmission manner.

That is, in this embodiment of the present disclosure, the MBB device can maintain a communication connection with the host in at least one manner of the following communication connection manners, a USB communication connection manner, a WI-FI communication connection manner, a WUSB communication connection manner, a THUNDERBOLT communication connection manner, a BT communication connection manner, a ZIGBEE communication connection manner, a DSRC communication connection manner, and a mobile communication connection manner.

It should be further understood that in this embodiment of the present disclosure, the MBB device may be a device that provides a wireless network access service for the host. For example, the MBB device provides the wireless network access service for the host using a communications system such as a second generation (2G), a third generation (3G), or a fourth generation (4G) communications system. For another example, the MBB device provides the wireless network access service for the host in a manner such as WIFI. For still another example, the MBB device provides the wireless network access service for the host using a technology such as DSRC. However, this embodiment of the present disclosure is not limited thereto.

In this embodiment of the present disclosure, the authentication information may be used for authentication between the MBB device and the notification server, for example, the authentication information is a character string KEY and the like used for authentication, the authentication information may be determined by the notification server, and may be sent to the MBB device by the host or an application of the host, to be used for authentication or authentication. For example, the authentication information is determined by the notification server according to information such as application information or host information. The host information includes, for example, at least one type of the following information device information of the host, user information of the host, and application information of the host.

Optionally, the authentication information is information determined by the notification server according to application information of the application, where the application information includes at least one type of the information, identification information of the application, version information of the application, login information of the application, identification information of the host, and identification information of the MBB device.

Further, in this embodiment of the present disclosure, optionally, the authentication information includes at least one type of the following information a key, identification information of the MBB device, identification information of the host, identification information of the application of the host, version information of the application, and login information of the application.

In this embodiment of the present disclosure, optionally, receiving, by the MBB device, authentication information sent by a host includes receiving, by the MBB device, the authentication information sent by the application of the host.

It should be understood that in this embodiment of the present disclosure, one or more applications may be set in the host, where the application is a software module running on hardware, for example, an instant messaging application such as WECHAT or QQ. In this embodiment of the present disclosure, optionally, the authentication information is determined by the notification server according to authentication request information sent by the application to the notification server.

Figure 2:
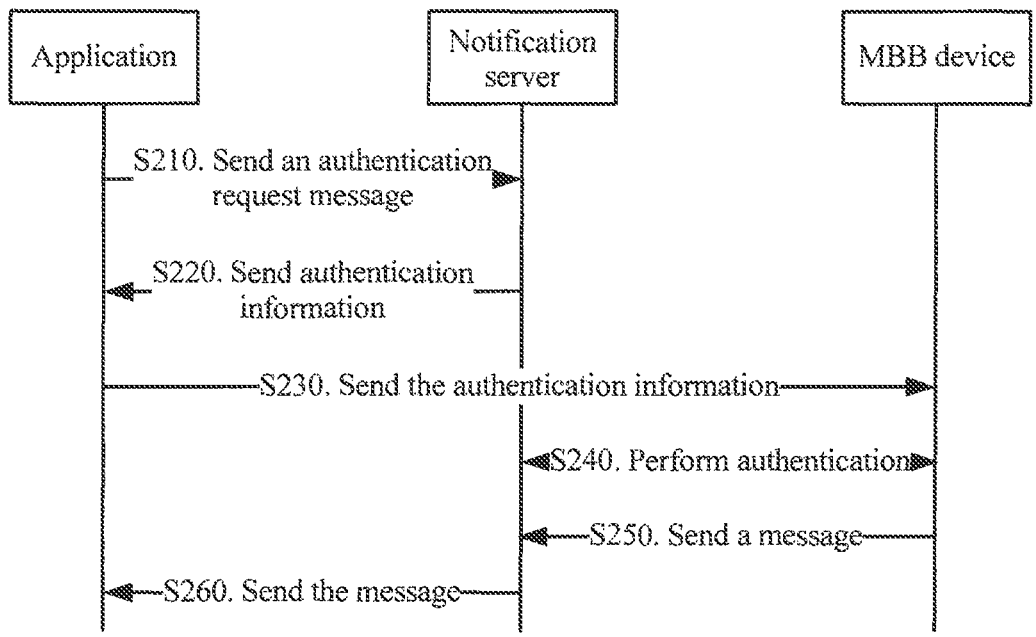
FIG. 2 is another schematic flowchart of a message sending method according to an embodiment of the present disclosure.

The following describes a message sending method in detail according to an embodiment of the present disclosure with reference to FIG. 2.

As shown in FIG. 2, in step S210, an application of a host sends an authentication request message to a notification server, where the authentication request message is used to request authentication from the notification server.

In this embodiment of the present disclosure, the authentication request message may further include application information and/or host information. The application information may include at least one type of the following information, identification information of the application, version information of the application, login information of the application, identification information of the host, and identification information of an MBB device. The host information includes, for example, at least one type of the following information, device information of the host, user information of the host, and application information of the host. However, the present disclosure is not limited thereto.

Further, the application of the host may send the authentication request message to a notification client disposed in the host, and the notification client then sends the authentication request message to the notification server. For example, the notification client establishes a communication connection with the notification server using a wireless network access service provided by the MBB device, and sends the authentication request message to the notification server. It should be understood that the notification client is a software module that is corresponding to the notification server and that is disposed in the host, where the software module runs on hardware and provides a local service for a customer.

In step S220, the notification server determines authentication information according to the authentication request message, and sends the authentication information to the application. For example, the notification server may generate, according to a preset algorithm, authentication information corresponding to the application information and/or the host information, where the authentication information is used for authentication between the MBB device and the notification server. Likewise, the notification server may send the authentication information to the notification client, and the notification client then sends the authentication information to the application.

Optionally, the authentication information includes at least one type of the following information, a key, identification information of the MBB device, identification information of the host, identification information of the application of the host, version information of the application, and login information of the application.

In step S230, the application of the host sends the authentication information to an MBB device, and the application may further send address information of the notification server to the MBB device such that the MBB device can perform authentication with the notification server according to the address information and the authentication information.

In step S240, the MBB device can pass authentication of the notification server according to the address information and the authentication information, and establish a transmission path between the MBB device and the notification server.

In step S250, the MBB device sends a message to the notification server using the transmission path when the message required to be transmitted to the application is determined.

In step S260, the notification server sends the message to the application using a notification client, thereby achieving active push of the message.

Therefore, according to the message sending method in this embodiment of the present disclosure, an MBB device receives authentication information sent by an application of a host, and passes authentication of a notification server according to the authentication information such that when there is a message to be transmitted to the application, the MBB device can send the message to the notification server using a transmission path established during an authentication process in order to send the message to the application of the host using the notification server. Therefore, the MBB device can actively push the message to the application regardless of whether the host is in a sleep state such that a large quantity of signaling overheads of the host that are caused by polling, and heavy power consumption of the host caused because the host cannot sleep can be avoided, as a result, signaling overheads can be significantly reduced, and power consumption can be reduced.

Figure 3:
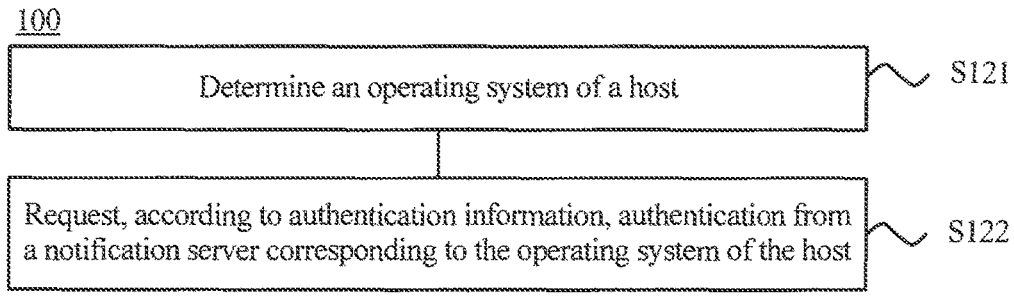
FIG. 3 is still another schematic flowchart of a message sending method according to an embodiment of the present disclosure.

In step S120, as shown in FIG. 3, that the MBB device requests authentication from a notification server according to the authentication information includes the following steps.

Step S121: Determine an operating system of the host.

Step S122: Request, according to the authentication information, authentication from a notification server corresponding to the operating system of the host.

Optionally, the operating system of the host includes an iOS operating system, a WINDOWS operating system, and an ANDROID operating system.

Further, in this embodiment of the present disclosure, the MBB device may be compatible with hosts that have different operating systems, and can also be compatible with notification servers that have different operating systems. For example, the MBB device may include authentication units for three operating systems, that is, an iOS authentication unit, a WINDOWS authentication unit, and an ANDROID authentication unit, where the iOS authentication unit is configured to request authentication from a notification server that has the iOS operating system, the WINDOWS authentication unit is configured to request authentication from a notification server that has the WINDOWS operating system, and the ANDROID authentication unit is configured to request authentication from a notification server that has the ANDROID operating system.

The MBB device may determine the operating system of the host when connecting to the host, or before connecting to the host. The MBB device may also determine, after receiving authentication information sent by an application, the operating system of the host according to the authentication information, or the MBB device may acquire operating system type information of the host included in the authentication information, and determine the operating system of the host. Optionally, the operating system type information includes at least one type of the following information, identification information of the host, identification information of the application, and identification information of the notification server.

For example, the MBB device confirms, according to the identification information of the application included in the authentication information, that the application belongs to the ANDROID operating system such that the MBB device may determine that an operating system type of the host is the ANDROID operating system. Therefore, for example, the ANDROID authentication unit in the MBB device passes authentication of the notification server that has the ANDROID operating system according to the address information and the authentication information, and establishes a transmission path between the MBB device and the notification server. That is, the message sending method in this embodiment of the present disclosure can be adapted to notification servers of various operating system types, and can also be adapted to hosts of various operating system types, thereby making it more convenient to push a message to various applications.

Therefore, according to the message sending method in this embodiment of the present disclosure, on the one hand, a large quantity of signaling overheads caused by polling, and heavy power consumption can be avoided, as a result, signaling overheads can be significantly reduced, and power consumption can be reduced. On the other hand, the method can be further compatible with notification servers that have different operating systems, and redeployment of a notification server and a service server caused by a difference between different operating systems is avoided such that a system scheme can be simplified, system costs can be reduced, and user experience can be improved.

In step S130, the MBB device determines the message required to be transmitted to the host. Further, in this embodiment of the present disclosure, the message to be transmitted to the host or the application of the host may be generated by the MBB device itself, or may be generated by a service server or another server. Optionally, the message required to be transmitted to the host is a message received by the MBB device from the service server, or the message required to be transmitted to the host is generated by the MBB device.

Figure 4:
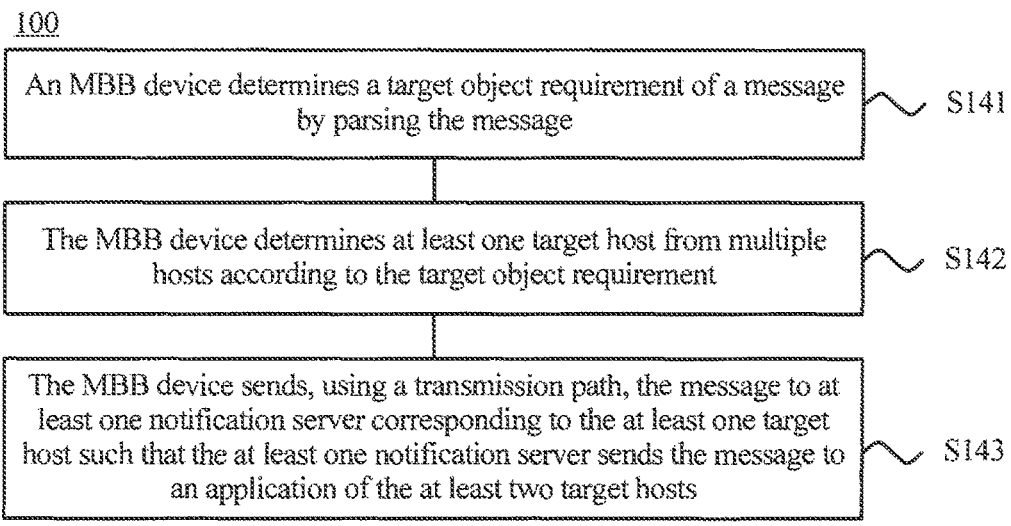
FIG. 4 is yet another schematic flowchart of a message sending method according to an embodiment of the present disclosure.

In step S140, the MBB device sends the message to the notification server using the transmission path. In this embodiment of the present disclosure, optionally, as shown in FIG. 4, that the MBB device sends the message to the notification server using the transmission path includes the following steps.

Step S141: The MBB device determines a target object requirement of the message by parsing the message.

Step S142: The MBB device determines at least one target host from multiple hosts according to the target object requirement.

Step S143: The MBB device sends, using the transmission path, the message to at least one notification server corresponding to the at least one target host such that the at least one notification server sends the message to an application of the at least one target host.

Further, the MBB device may determine a target object requirement of the message by parsing the message when there is a message to be transmitted to the application, and may therefore, further determine at least one target host from the multiple hosts according to host information or service logic of the message. Therefore, the MBB device may send, using the transmission path, the message to at least one notification server corresponding to the at least one target host such that the at least one notification server sends the message to an application of the at least one target host. Unicast of the message is achieved when the at least one target host determined by the MBB device is only one host, multicast of the message is achieved when the at least one target host determined by the MBB device includes two or more hosts.

In this embodiment of the present disclosure, the MBB device may determine the target object requirement of the message by parsing the message, or the MBB device may determine, according to specific target host information carried in the message, the target host that receives the message. Optionally, that the MBB device sends the message to the notification server using the transmission path which includes sending, by the MBB device according to the target host information carried in the message, the message to a notification server corresponding to the target host indicated by the target host information such that the notification server sends the message to an application of the target host.

It should be understood that in this embodiment of the present disclosure, the target host indicated by the target host information includes one or more hosts, and the notification server corresponding to the target host indicated by the target host information may also include one or more servers, and this embodiment of the present disclosure is not limited thereto.

For example, it is assumed the target host information that is included in the message and that is acquired by the MBB device by parsing the message to be transmitted to the application is information about an application A1 of a host A. Then, the MBB device sends the message to a notification server corresponding to the host A using an established transmission path between the MBB device and the notification server, and the notification server sends the message to the application A1 of the host A using a corresponding notification client. This scheme is a message unicast scheme.

For another example, it is assumed that the MBB device determines, by parsing the message, a target object requirement of the message to be transmitted to the application, thereby further determining that the message needs to be sent to a user aged over 18 years old. Then, the MBB device may determine, among multiple hosts according to acquired user information of the host, three target hosts B, C, and D that meet the condition. Then, the MBB device may separately send, using an established transmission path, the message to notification servers corresponding to the hosts B, C, and D, and these notification servers may separately send the message to applications of the hosts B, C, and D using corresponding notification clients, where these notification servers may be one server, or may be multiple different servers, and this embodiment of the present disclosure is not limited thereto. This scheme is a message multicast scheme.

It should be further understood that in this embodiment of the present disclosure, one host may be corresponding to one notification server, multiple hosts may also be corresponding to one notification server, and a host and a notification server that are corresponding to each other may be compatible with a same type of operating system, for example, an ANDROID operating system type. However, this embodiment of the present disclosure is not limited thereto. For example, when a host can be compatible with multiple types of operating systems, the host can also be separately corresponding to multiple notification servers that are compatible with different types of operating systems.

Therefore, according to the message sending method in this embodiment of the present disclosure, an MBB device receives authentication information sent by an application of a host, and passes authentication of a notification server according to the authentication information such that when a message required to be transmitted to the application is determined, the MBB device can send the message to the notification server using a transmission path established during an authentication process in order to send the message to the application of the host using the notification server. Therefore, the MBB device can actively push the message to the application regardless of whether the host is in a sleep state such that a large quantity of signaling overheads of the host that are caused by polling, and heavy power consumption of the host caused because the host cannot sleep can be avoided. As a result, signaling overheads of the host can be significantly reduced, and power consumption of the host can be reduced. In addition, according to the message sending method in this embodiment of the present disclosure, unicast or multicast of the message can be provided regardless of whether the notification server can support unicast or multicast.

It should be understood that in various embodiments of the present disclosure, sequence numbers of the foregoing processes do not mean execution sequences. The execution sequences of the processes should be determined according to functions and internal logic of the processes, and do not impose any limitation on the implementation processes of the embodiments of the present disclosure.

With reference to FIG. 1 to FIG. 4, the foregoing describes the message sending method in detail according to the embodiments of the present disclosure, and with reference to FIG. 5, FIG. 6, FIG. 7, FIG. 8, and FIG. 9, the following describes in detail an MBB device and a host for sending a message according to the embodiments of the present disclosure.

Figure 5:
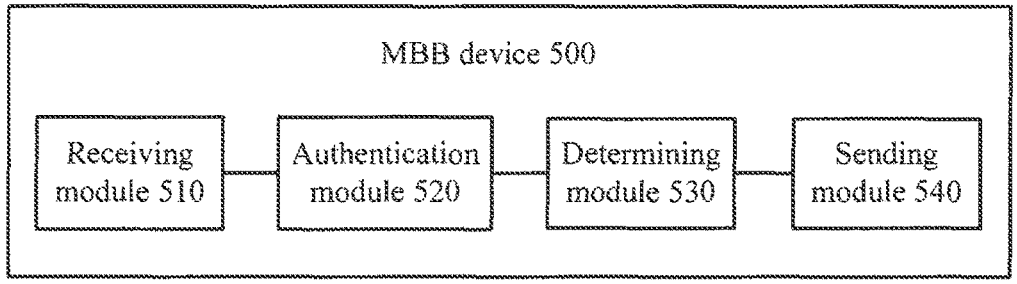
FIG. 5 is a schematic block diagram of an MBB device according to an embodiment of the present disclosure.

As shown in FIG. 5, an MBB device 500 according to an embodiment of the present disclosure includes a receiving module 510 configured to receive authentication information sent by a host, an authentication module 520 configured to request authentication from a notification server according to the authentication information received by the receiving module 510, to establish a transmission path between the MBB device 500 and the notification server, a determining module 530 configured to determine a message required to be transmitted to the host, and a sending module 540 configured to send the message determined by the determining module 530 to the notification server using the transmission path such that the notification server sends the message to the host.

It should be understood that because the notification server is bound to an operating system of the host, the notification server has higher operating permission, and has a capability of actively sending a notification message to the host, and can also wake up a host in a sleep state. Therefore, after receiving the message sent by the MBB device, the notification server may further send the message to the host such that the message can be actively pushed to the host, and even if the host is in a sleep state, the notification server can wake up the host such that the host can acquire the message in real time.

Therefore, according to the MBB device 500 in this embodiment of the present disclosure, the MBB device 500 receives authentication information sent by a host, and passes authentication of a notification server according to the authentication information such that when a message required to be transmitted to the host is determined, the MBB device 500 can send the message to the notification server using a transmission path established during an authentication process in order to send the message to the host using the notification server. Therefore, the MBB device 500 can actively push the message to the host regardless of whether the host is in a sleep state such that a large quantity of signaling overheads of the host that are caused by polling, and heavy power consumption of the host caused because the host cannot sleep can be avoided. As a result, signaling overheads of the host can be significantly reduced, and power consumption of the host can be reduced.

In this embodiment of the present disclosure, optionally, the receiving module 510 is further configured to receive the authentication information sent by the host in at least one transmission manner of the following transmission manners, a USB transmission manner, a WI-FI transmission manner, a WUSB transmission manner, a THUNDERBOLT transmission manner, a BT transmission manner, a ZIGBEE transmission manner, a DSRC technology transmission manner, and a mobile communication transmission manner.

In this embodiment of the present disclosure, optionally, the receiving module 510 is further configured to receive the authentication information sent by an application of the host.

In this embodiment of the present disclosure, optionally, the authentication information received by the receiving module 510 is determined by the notification server according to authentication request information sent by the application to the notification server.

In this embodiment of the present disclosure, optionally, the authentication information received by the receiving module 510 includes at least one type of the following information, a key, identification information of the MBB device, identification information of the host, identification information of the application of the host, version information of the application, and login information of the application.

In this embodiment of the present disclosure, optionally, the determining module 530 is further configured to determine an operating system of the host, where the authentication module 520 is further configured to request, according to the authentication information, authentication from a notification server corresponding to the operating system of the host.

Figure 6:
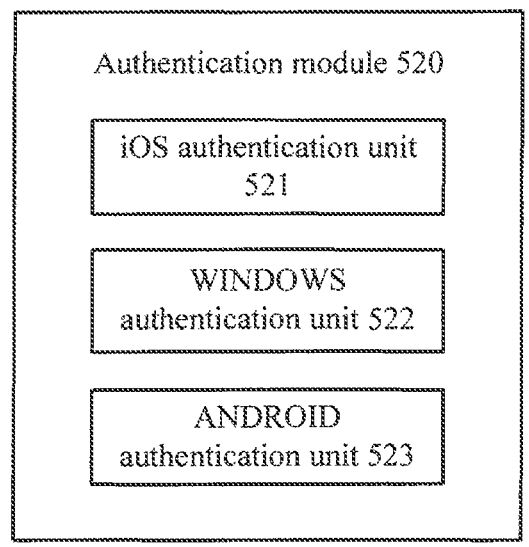
FIG. 6 is a schematic block diagram of an authentication module according to an embodiment of the present disclosure.

In this embodiment of the present disclosure, optionally, as shown in FIG. 6, the authentication module 520 includes an iOS authentication unit 521 configured to request authentication from the notification server that has an iOS operating system, a WINDOWS authentication unit 522 configured to request authentication from the notification server that has a WINDOWS operating system, and an ANDROID authentication unit 523 configured to request authentication from the notification server that has an ANDROID operating system.

In this embodiment of the present disclosure, optionally, the determining module 530 is further configured to determine a target object requirement of the message by parsing the message, and determine at least one target host from multiple hosts according to the target object requirement, where the sending module 540 is further configured to send, using the transmission path, the message to at least one notification server corresponding to the at least one target host such that the at least one notification server sends the message to an application of the at least one target host.

In this embodiment of the present disclosure, optionally, the sending module 540 is further configured to send, according to target host information carried in the message, the message to a notification server corresponding to a target host indicated by the target host information such that the notification server sends the message to an application of the target host.

In this embodiment of the present disclosure, optionally, the message that is determined by the determining module 530 and that is required to be transmitted to the host is a message received from a service server by the MBB device 500, or the message that is determined by the determining module 530 and that is required to be transmitted to the host is generated by the MBB device 500.

In this embodiment of the present disclosure, optionally, the MBB device 500 is disposed in the host. It should be understood that the MBB device 500 being disposed in the host is only used as an example in this embodiment of the present disclosure. However, the present disclosure is not limited thereto. The MBB device 500 may further be a single independent device. For example, the MBB device 500 may be connected to the host through a USB interface. For another example, the MBB device 500 may be connected to the host in a manner such as WI-FI. However, the present disclosure is not limited thereto.

Figure 7:
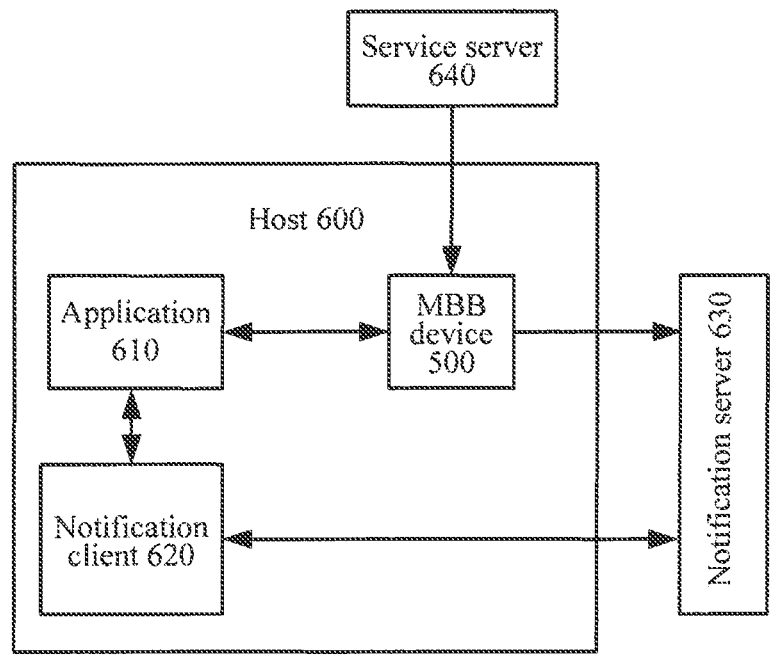
FIG. 7 is a schematic block diagram of an application scenario of an MBB device according to an embodiment of the present disclosure.

FIG. 7 shows a schematic block diagram of an application scenario of an MBB device according to an embodiment of the present disclosure. As shown in FIG. 7, an application 610 of a host 600 may send an authentication request message to a notification client 620 disposed in the host 600, and the notification client 620 then sends the authentication request message to a notification server 630. For example, the notification client 620 establishes a communication connection with the notification server 630 using a wireless network access service provided by an MBB device 500, and sends the authentication request message to the notification server 630.

The authentication request message may further include application information and/or host information. The application information may include at least one type of the following information, identification information of the application, version information of the application, login information of the application, identification information of the host, and identification information of the MBB device. The host information includes, for example, at least one type of the following information, device information of the host, user information of the host, and application information of the host. However, the present disclosure is not limited thereto.

The notification server 630 may generate, according to a preset algorithm, authentication information used for authentication or authentication between the MBB device 500 and the notification server 630. Optionally, the authentication information includes at least one type of the following information, a key, identification information of the MBB device, identification information of the host, identification information of the application of the host, version information of the application, and login information of the application. The notification server 630 may send the authentication information to the notification client 620, and the notification client 620 then sends the authentication information to the application 610.

The application 610 may send the authentication information to the MBB device 500, and the MBB device 500 may pass authentication of the notification server 630 according to address information of the notification server 630 and the authentication information, and establish a transmission path between the MBB device 500 and the notification server 630.

When the MBB device 500 receives a message that is to be transmitted to the application 610 and that is sent by a service server 640 or another server, or when the MBB device 500 itself generates a message to be transmitted to the application 610, the MBB device 500 sends the message to the notification server 630 using the established transmission path, and the notification server 630 then sends the message to the application 610 using the notification client 620, thereby achieving active push of the message.

It should be understood that the MBB device 500 according to this embodiment of the present disclosure may be corresponding to the MBB device executing the message sending method according to the embodiments of the present disclosure, and the foregoing and other operations and/or functions of the modules of the MBB device 500 are separately used to implement corresponding procedures of the methods shown in FIG. 1 to FIG. 4. For brevity, details are not described herein again.

Therefore, according to the MBB device 500 in this embodiment of the present disclosure, the MBB device 500 receives authentication information sent by a host 600, and passes authentication of a notification server according to the authentication information such that when a message required to be transmitted to the host 600 is determined, the MBB device 500 can send the message to the notification server using a transmission path established during an authentication process in order to send the message to the host 600 using the notification server 630. Therefore, the MBB device 500 can actively push the message to the host 600 regardless of whether the host 600 is in a sleep state such that a large quantity of signaling overheads of the host that are caused by polling, and heavy power consumption of the host 600 caused because the host 600 cannot sleep can be avoided. As a result, signaling overheads of the host 600 can be significantly reduced, and power consumption of the host 600 can be reduced.

In another aspect, according to the MBB device 500 in this embodiment of the present disclosure, a scheme of active message notification can be evolved from a scheme in which a message is pushed by a server in the industry to a scheme in which a message is pushed by a terminal, and the MBB device 500 is used as an important component of a push mechanism such that a common message can also be pushed. Therefore, it is not required to redevelop and deploy a new service server for the push mechanism.

In still another aspect, the MBB device 500 in this embodiment of the present disclosure can further be compatible with notification servers of different operating system types, and redeployment of a notification server and a service server caused by a difference between different operating system types is avoided such that a system scheme can be simplified, system costs can be reduced, and user experience can be improved. In addition, according to the MBB device 500 in this embodiment of the present disclosure, unicast or multicast of the message can further be provided regardless of whether the notification server 630 can support unicast or multicast.

Figure 8:
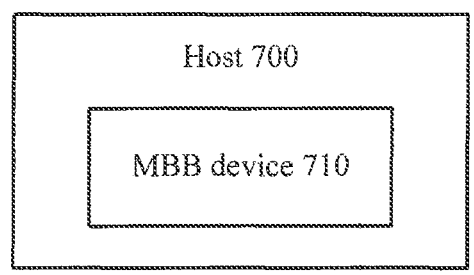
FIG. 8 is a schematic block diagram of a host according to an embodiment of the present disclosure.

As shown in FIG. 8, an embodiment of the present disclosure further provides a host 700, where the host 700 includes an MBB device 710 according to the embodiments of the present disclosure, and the MBB device 710 includes a receiving module (not shown) configured to receive authentication information sent by the host 700, an authentication module (not shown) configured to request authentication from a notification server according to the authentication information received by the receiving module, to establish a transmission path between the MBB device and the notification server, a determining module (not shown) configured to determine a message required to be transmitted to the host 700, and a sending module (not shown) configured to send the message determined by the determining module to the notification server using the transmission path such that the notification server sends the message to the host 700.

Therefore, according to the host in this embodiment of the present disclosure, an MBB device 710 included in the host 700 receives authentication information sent by the host 700, and passes authentication of a notification server according to the authentication information such that when a message required to be transmitted to the host is determined, the MBB 710 device can send the message to the notification server using a transmission path established during an authentication process in order to send the message to the host 700 using the notification server. Therefore, the MBB device 710 can actively push the message to the host regardless of whether the host 700 is in a sleep state such that a large quantity of signaling overheads of the host 700 that are caused by polling, and heavy power consumption of the host caused because the host cannot sleep can be avoided. As a result, signaling overheads of the host 700 can be significantly reduced, and power consumption of the host 700 can be reduced.

In this embodiment of the present disclosure, optionally, the receiving module is further configured to receive, in at least one transmission manner of the following transmission manners, the authentication information sent by the host a USB transmission manner, a WI-FI transmission manner, a WUSB transmission manner, a THUNDERBOLT transmission manner, a BT transmission manner, a ZIGBEE transmission manner, a DSRC technology transmission manner, and a mobile communication transmission manner.

In this embodiment of the present disclosure, optionally, the receiving module is further configured to receive the authentication information sent by an application of the host 700.

In this embodiment of the present disclosure, optionally, the authentication information received by the receiving module is determined by the notification server according to authentication request information sent by the application to the notification server.

In this embodiment of the present disclosure, optionally, the authentication information received by the receiving module includes at least one type of the following information, a key, identification information of the MBB device, identification information of the host, identification information of the application of the host, version information of the application, and login information of the application.

In this embodiment of the present disclosure, optionally, the determining module is further configured to determine an operating system of the host 700, where the authentication module is further configured to request, according to the authentication information, authentication from a notification server corresponding to the operating system of the host.

In this embodiment of the present disclosure, optionally, the authentication module includes an iOS authentication unit (not shown) configured to request authentication from the notification server that has an iOS operating system, a WINDOWS authentication unit (not shown) configured to request authentication from the notification server that has a WINDOWS operating system, and an ANDROID authentication unit (not shown) configured to request authentication from the notification server that has an ANDROID operating system.

In this embodiment of the present disclosure, optionally, the determining module is further configured to determine a target object requirement of the message by parsing the message, and determine at least one target host from multiple hosts according to the target object requirement, where the sending module is further configured to send, using the transmission path, the message to at least one notification server corresponding to the at least one target host such that the at least one notification server sends the message to an application of the at least one target host.

In this embodiment of the present disclosure, optionally, the sending module is further configured to send, according to target host information carried in the message, the message to a notification server corresponding to a target host indicated by the target host information such that the notification server sends the message to an application of the target host.

In this embodiment of the present disclosure, optionally, the message that is determined by the determining module and that is required to be transmitted to the host is a message received from a service server by the MBB device, or the message that is determined by the determining module and that is required to be transmitted to the host 700 is generated by the MBB device 710.

In this embodiment of the present disclosure, optionally, the MBB device 710 is disposed in the host 700.

It should be understood that the MBB device 710 included in the host 700 according to this embodiment of the present disclosure may be corresponding to the MBB device executing the message sending method according to the embodiments of the present disclosure, and may further be corresponding to the MBB device 500 according to the embodiment of the present disclosure, and the foregoing and other operations and/or functions of the modules of the MBB device 710 are separately used to implement corresponding procedures of the methods shown in FIG. 1 to FIG. 4. For brevity, details are not described herein again.

Therefore, according to the host in this embodiment of the present disclosure, an MBB device 710 included in the host 700 receives authentication information sent by the host 700, and passes authentication of a notification server according to the authentication information such that when a message required to be transmitted to the host is determined, the MBB device 710 can send the message to the notification server using a transmission path established during an authentication process in order to send the message to the host using the notification server. Therefore, the MBB device 710 can actively push the message to the host 700 regardless of whether the host 700 is in a sleep state such that a large quantity of signaling overheads of the host 700 that are caused by polling, and heavy power consumption of the host caused because the host cannot sleep can be avoided, as a result, signaling overheads of the host 700 can be significantly reduced, and power consumption of the host 700 can be reduced.

Figure 9:
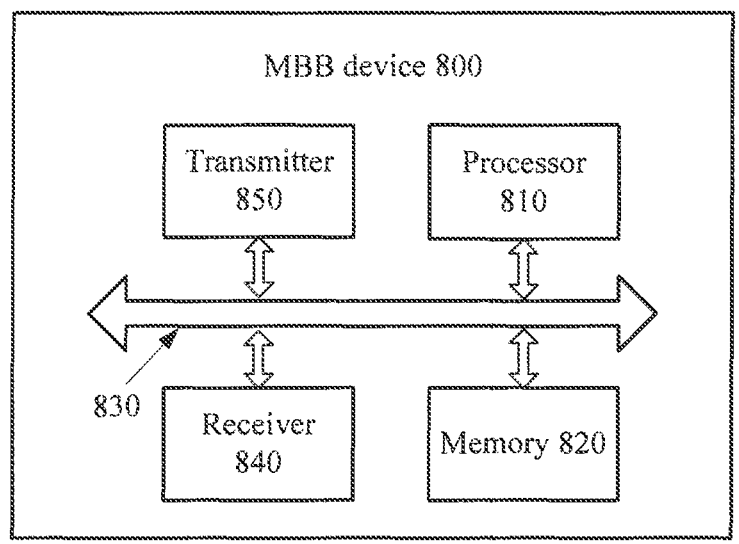
FIG. 9 is a schematic block diagram of an MBB device according to another embodiment of the present disclosure.

As shown in FIG. 9, an embodiment of the present disclosure further provides an MBB device 800, where the MBB device 800 includes a processor 810, a memory 820, a bus system 830, a receiver 840, and a transmitter 850. The processor 810, the memory 820, the receiver 840, and the transmitter 850 are connected to each other using the bus system 830, the memory 820 is configured to store an instruction, and the processor 810 is configured to execute the instruction stored in the memory 820 in order to control the receiver 840 to receive a signal and control the transmitter 850 to send a signal. The receiver 840 is configured to receive authentication information sent by a host. The processor 810 is configured to request authentication from a notification server according to the authentication information, to establish a transmission path between the MBB device 800 and the notification server. The processor 810 is further configured to determine a message required to be transmitted to the host. The transmitter 850 is further configured to send the message to the notification server using the transmission path such that the notification server sends the message to the host.

Therefore, according to the MBB device 800 in this embodiment of the present disclosure, the MBB device 800 receives authentication information sent by a host, and passes authentication of a notification server according to the authentication information such that when a message required to be transmitted to the host is determined, the MBB device 800 can send the message to the notification server using a transmission path established during an authentication process in order to send the message to the host using the notification server. Therefore, the MBB device 800 can actively push the message to the host regardless of whether the host is in a sleep state such that a large quantity of signaling overheads of the host that are caused by polling, and heavy power consumption of the host caused because the host cannot sleep can be avoided. As a result, signaling overheads of the host can be significantly reduced, and power consumption of the host can be reduced.

It should be understood that in this embodiment of the present disclosure, the processor 810 may be a central processing unit (CPU), or the processor 810 may be another general-purpose processor, a digital signal processor (DSP), an application-specific integrated circuit (ASIC), a field programmable gate array (FPGA) or another programmable logic device, a discrete gate or transistor logic device, a discrete hardware assembly, or the like. The general-purpose processor may be a microprocessor or the processor may also be any conventional processor, or the like.

The memory 820 may include a read-only memory (ROM) and a random access memory (RAM), and provides an instruction and data to the processor 810. A part of the memory 820 may further include a nonvolatile RAM. For example, the memory 820 may further store information about a device type.

In addition to a data bus, the bus system 830 may further include a power bus, a control bus, a status signal bus, and the like. However, for clarity of description, various buses are denoted as the bus system 830 in the figure.

In an implementation process, the steps in the foregoing methods may be completed by an integrated logic circuit of hardware in the processor 810 or an instruction in a form of software. Steps of the methods disclosed with reference to the embodiments of the present disclosure may be directly embodied as being executed and completed by a hardware processor, or executed and completed using a combination of hardware and software modules in the processor 810. The software module may be located in a mature storage medium in the field, such as a RAM, a flash memory, a ROM, a programmable ROM, an electrically-erasable programmable memory, or a register. The storage medium is located in the memory 820. The processor 810 reads information from the memory 820, and completes the steps of the foregoing methods in combination with the hardware. To avoid repetition, details are not described herein again.

Optionally, as an embodiment, the receiver 840 receives the authentication information sent by a host, in at least one transmission manner of the following transmission manners, a USB transmission manner, a WI-FI transmission manner, a WUSB transmission manner, a THUNDERBOLT transmission manner, a BT transmission manner, a ZIGBEE transmission manner, a DSRC technology transmission manner, and a mobile communication transmission manner.

Optionally, as an embodiment, the receiver 840 receives authentication information sent by a host includes the authentication information sent by an application of the host.

Optionally, as an embodiment, the authentication information received by the receiver 840 is determined by the notification server according to authentication request information sent by the application to the notification server.

Optionally, as an embodiment, the authentication information received by the receiver 840 includes at least one type of the following information, a key, identification information of the MBB device, identification information of the host, identification information of the application of the host, version information of the application, and login information of the application.

Optionally, as an embodiment, that the processor 810 requests authentication from a notification server according to the authentication information includes determining an operating system of the host, requesting, according to the authentication information, authentication from a notification server corresponding to the operating system of the host.

Optionally, as an embodiment, the operating system of the host includes an iOS operating system, a WINDOWS operating system, and an ANDROID operating system.

Optionally, as an embodiment, the processor 810 is further configured to determine a target object requirement of the message by parsing the message, and determine at least one target host from multiple hosts according to the target object requirement, where that the transmitter 850 sends the message to the notification server using the transmission path includes that the MBB device 800 sends, using the transmission path, the message to at least one notification server corresponding to the at least one target host such that the at least one notification server sends the message to an application of the at least one target host.

Optionally, as an embodiment, that the transmitter 850 sends the message to the notification server using the transmission path includes that the transmitter 850 sends, according to target host information carried in the message, the message to a notification server corresponding to a target host indicated by the target host information such that the notification server sends the message to an application of the target host.

Optionally, as an embodiment, the message that is determined by the processor 810 and that is required to be transmitted to the host is a message received from a service server by the MBB device 800, or the message that is determined by the processor 810 and that is required to be transmitted to the host is generated by the MBB device 800.

Optionally, as an embodiment, the MBB device 800 is disposed in the host.

It should be understood that the MBB device 800 according to this embodiment of the present disclosure may be corresponding to the MBB device executing the message sending method according to the embodiments of the present disclosure, and may further be corresponding to the MBB devices 500 and 710 according to the embodiments of the present disclosure, and the foregoing and other operations and/or functions of the modules of the MBB device 800 are separately used to implement corresponding procedures of the methods shown in FIG. 1 to FIG. 4. For brevity, details are not described herein again.

Therefore, according to the MBB device 800 in this embodiment of the present disclosure, the MBB device 800 receives address information of a notification server and authentication information that are sent by an application, and passes authentication of the notification server according to the address information and the authentication information such that when there is a message to be transmitted to the application, the MBB device 800 can send the message to the notification server in order to send the message to an application of a host using the notification server. Therefore, the MBB device 800 can actively push the message to the application such that a large quantity of signaling overheads caused by polling, and heavy power consumption can be avoided, as a result, signaling overheads can be significantly reduced, and power consumption can be reduced.

In addition, the terms "system" and "network" may be used interchangeably in this specification. The term "and/or" in this specification describes only an association relationship for describing associated objects and represents that three relationships may exist. For example, A and/or B may represent the following three cases Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and that B may be determined according to A. However, it should be further understood that determining B according to A does not mean that B is determined only according to A, and B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A message sending method, comprising:
   receiving, by a mobile broadband (MBB) device, authentication information sent by a host;
   requesting, by the MBB device, authentication from a notification server according to the authentication information in order to establish a transmission path between the MBB device and the notification server by:
   determining an operating system of the host; and
   requesting, according to the authentication information, authentication from a notification server corresponding to the operating system of the host;
   determining, by the MBB device, a message required to be transmitted to the host; and
   sending, by the MBB device according to target host information carried in the message, the message to a notification server corresponding to a target host indicated by the target host information such that the notification server sends the message to an application of the target host.

2. The method according to claim 1, wherein sending the message to the notification server comprises:
   determining, by the MBB device, a target object requirement of the message by parsing the message;
   determining, by the MBB device, at least one target host from multiple hosts according to the target object requirement; and
   sending, by the MBB device using the transmission path, the message to at least one notification server corresponding to the at least one target host such that the at least one notification server sends the message to an application of the at least one target host.

3. The method according to claim 1, wherein the operating system of the host comprises an iOS operating system, a WINDOWS operating system, and an ANDROID operating system.

4. The method according to claim 1, wherein receiving the authentication information sent by the host comprises receiving, by the MBB device, the authentication information sent by the host in at least one transmission manner, wherein the at least one transmission manner comprises a Universal Serial Bus (USB) transmission manner, a WI-FI transmission manner, a Wireless Universal Serial Bus (WUSB) transmission manner, a THUNDERBOLT transmission manner, a bit torrent (BT) transmission manner, a ZIGBEE transmission manner, a dedicated short range communications (D SRC) technology transmission manner, or a mobile communication transmission manner.

5. The method according to claim 1, wherein receiving the authentication information sent by the host comprises receiving, by the MBB device, the authentication information sent by an application of the host.

6. The method according to claim 5, wherein the authentication information is determined by the notification server according to authentication request information sent by the application to the notification server.

7. The method according to claim 1, wherein the authentication information comprises at least one type of the following information:
   a key;
   identification information of the MBB device;
   identification information of the host;
   identification information of an application of the host;
   version information of the application; and
   login user information of the application.

8. The method according to claim 1, wherein the message required to be transmitted to the host is a message received from a service server by the MBB device, or the message required to be transmitted to the host is a message generated by the MBB device.

9. A mobile broadband (MBB) device, comprising:
   a memory; and
   a processor coupled to the memory and configured to:
   receive authentication information sent by a host;
   request authentication from a notification server according to the received authentication information in order to establish a transmission path between the MBB device and the notification server by:
   determine an operating system of the host; and
   request, according to the authentication information, authentication from a notification server corresponding to the operating system of the host;
   determine a message required to be transmitted to the host; and
   send, according to target host information carried in the message, the message to a notification server corresponding to a target host indicated by the target host information such that the notification server sends the message to an application of the target host.

10. The MBB device according to claim 9, wherein the processor is further configured to:

determine a target object requirement of the message by parsing the message;

determine at least one target host from multiple hosts according to the target object requirement; and send, using the transmission path, the message to at least one notification server corresponding to the at least one target host such that the at least one notification server sends the message to an application of the at least one target host.

11. The MBB device according to claim 9, wherein the processor is further configured to:

request authentication from the notification server that has an iOS operating system;

request authentication from the notification server that has a WINDOWS operating system; or request authentication from the notification server that has an ANDROID operating system.

12. The MBB device according to claim 9, wherein the processor is further configured to receive the authentication information sent by the host, in at least one transmission manner, wherein the at least one transmission manner comprises a Universal Serial Bus (USB) transmission manner, a WI-FI transmission manner, a Wireless Universal Serial Bus (WUSB) transmission manner, a THUNDERBOLT transmission manner, a bit torrent (BT) transmission manner, a ZIGBEE transmission manner, a dedicated short range communications (DSRC) technology transmission manner, or a mobile communication transmission manner.

13. The MBB device according to claim 9, wherein the processor is further configured to receive the authentication information sent by an application of the host.

14. The MBB device according to claim 13, wherein the received authentication information is determined by the notification server according to authentication request information sent by the application to the notification server.

15. The MBB device according to claim 9, wherein the received authentication information comprises at least one type of the following information:

a key;
identification information of the MBB device;
identification information of the host;
identification information of an application of the host;
version information of the application; and
login information of the application.

16. The MBB device according to claim 9, wherein the message that is determined and that is required to be transmitted to the host is a message received from a service server by the MBB device, or the message that is determined and that is required to be transmitted to the host is a message generated by the MBB device.

* * * * *

UNITED STATES PATENT AND TRADEMARK OFFICE
CERTIFICATE OF CORRECTION

PATENT NO. : 10,327,114 B2
APPLICATION NO. : 15/321311
DATED : June 18, 2019
INVENTOR(S) : Dedong Yang, Zhen Zhong and Wei Chen It is certified that error appears in the above-identified patent and that said Letters Patent is hereby corrected as shown below:

In the Claims

Claim 4, Column 22, Line 23: "(D SRC)" should read "(DSRC)"

Signed and Sealed this
Twentieth Day of August, 2019

Andrei Iancu
*Director of the United States Patent and Trademark Office*